(12) United States Patent
Bowman et al.

(10) Patent No.: US 10,240,885 B2
(45) Date of Patent: Mar. 26, 2019

(54) SHOCK ABSORBING DISRUPTOR MOUNTING SYSTEM

(71) Applicant: HARRIS CORPORATION, Melbourne, FL (US)

(72) Inventors: Michael E. Bowman, Satellite Beach, FL (US); Matthew D. Summer, Melbourne, FL (US); Paul M. Bosscher, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 351 days.

(21) Appl. No.: 15/372,070

(22) Filed: Dec. 7, 2016

(65) Prior Publication Data

US 2018/0156562 A1 Jun. 7, 2018

(51) Int. Cl.
| | |
|---|---|
| *F41A 25/18* | (2006.01) |
| *B25J 11/00* | (2006.01) |
| *B25J 15/00* | (2006.01) |
| *B25J 19/00* | (2006.01) |
| *F41A 25/00* | (2006.01) |
| *F41A 25/22* | (2006.01) |
| *F41A 25/24* | (2006.01) |

(52) U.S. Cl.
CPC ........... *F41A 25/18* (2013.01); *B25J 11/0025* (2013.01); *B25J 15/00* (2013.01); *B25J 19/0091* (2013.01); *F41A 25/00* (2013.01); *F41A 25/22* (2013.01); *F41A 25/24* (2013.01)

(58) Field of Classification Search
CPC .. F41A 21/36; F41A 1/08; F41A 25/10; F41A 25/02; F41A 25/16; F41A 25/00; F41A 25/12; F41A 27/00; F41H 11/12; F41H 11/16; F41H 7/00; F41H 13/0043; F41B 9/0046
See application file for complete search history.

(56) References Cited

U.S. PATENT DOCUMENTS

| 4,088,057 A | 5/1978 | Nasypany |
| 6,113,343 A | 9/2000 | Goldenberg et al. |

(Continued)

FOREIGN PATENT DOCUMENTS

| EP | 2 400 255 A2 | 12/2011 |
| EP | 2 406 519 A1 | 1/2012 |

(Continued)

OTHER PUBLICATIONS

European Search Report dated Feb. 19, 2018 for European Patent Application No. 17001940.0-1018.

(Continued)

*Primary Examiner* — Benjamin P Lee
(74) *Attorney, Agent, or Firm* — Fox Rothschild LLP; Robert J. Sacco; Carol E. Thorstad-Forsyth (57) ABSTRACT

A shock absorbing disruptor mounting system for a robotic arm includes a rack comprised of a linear guide structure and a carriage which is configured to travel on the linear guide structure. The carriage is selectively movable between a retracted position and an extended position and includes a plurality of wheels along its length. Each of the wheels has a wheel axis of rotation which is transverse to the direction of the linear guide structure centerline to facilitate rotation of the wheels on at least a portion of the linear guide structure responsive to the travel.

23 Claims, 9 Drawing Sheets (56) References Cited

U.S. PATENT DOCUMENTS

| | | | |
|---|---|---|---|
| 6,889,594 B2* | 5/2005 | Ebersole, Jr. | F41A 25/06 |
| | | | 42/1.06 |
| 7,228,778 B2* | 6/2007 | Edwards | F41A 25/02 |
| | | | 42/1.06 |
| 7,836,811 B1* | 11/2010 | Gardner | F41A 23/28 |
| | | | 102/402 |
| 7,895,930 B2* | 3/2011 | Fisk | F41A 25/08 |
| | | | 102/402 |
| 9,546,840 B1* | 1/2017 | Bartell | F41A 25/12 |
| 2004/0007124 A1 | 1/2004 | Nakatani | |
| 2011/0000363 A1* | 1/2011 | More | F41A 25/04 |
| | | | 89/43.01 |
| 2016/0033239 A1* | 2/2016 | Bosscher | F41H 11/12 |
| | | | 89/1.13 |

FOREIGN PATENT DOCUMENTS

| | | |
|---|---|---|
| EP | 3 098 031 A1 | 11/2016 |
| WO | 2016/079349 A1 | 5/2016 |

OTHER PUBLICATIONS

Li, Z.C., et al., "A gun recoil system employing a magnetorheological fluid damper," Smart Materials and Structures, v. 21, n. 10, 2012.

Maravandi, A., et al., "Regenerative shock absorber using a two-leg motion conversion mechanism," IEEE/ASME Transactions on Mechatronics, v. 20, n. 6, pp. 2853-2861, Dec. 2015.

David, A., et al., "Study of an External Passive Shock-Absorbing Mechanism for Walking Robots," 8th IEEE-RAS International Conference on Humanoid Robots, pp. 435-440, 2008.

\* cited by examiner

SHOCK ABSORBING DISRUPTOR MOUNTING SYSTEM

BACKGROUND

Statement of the Technical Field

The technical field of this disclosure comprises systems and methods for defeating explosive ordinance and more particularly concerns systems and methods for deploying disruptor devices using unmanned robotic vehicles.

Description of the Related Art

Projected water disruptors utilize a charge-propelled water projectile to destroy explosive ordnance by rapidly separating the components of the explosive device, rendering it unable to detonate. One limitation of such disruptor devices is that they need to be positioned in close proximity to the explosive ordinance in order to be effective. This can require explosive ordinance disposal (EOD) personnel to be in dangerous proximity to the explosive ordinance. Accordingly, an unmanned robotic vehicle (URV) can be used in place of a person to position the disruptor. For example, a disruptor can be mounted on a robotic manipulator arm of the URV to facilitate the positioning of the disruptor in an optimal location.

Still, the use of a URV for this purpose can also have certain drawbacks. For example, high impulse loads associated with disruptors have the potential to damage the robot or its manipulator arm. As threats become harder to deal with, EOD personnel deploy higher power disruptor devices which increase the potential for damaging the URV. In order to address this issue, the disruptor can be mounted to the robotic manipulator arm with a conventional shock absorber. The shock absorber reduces the maximum forces transmitted to the arm by converting the kinetic energy produced by the disruptor and converting it to thermal energy (heat) that is then dissipated into the surrounding environment. Typically, this is accomplished by using a piston rod to force hydraulic fluid through a plurality of small orifices in a cylinder.

SUMMARY

Embodiments concern a shock absorbing disruptor mount. The mount includes a rack comprised of a linear guide structure which extends in a first direction to define a linear path aligned with a linear guide structure centerline. A carriage is configured to travel on the linear guide structure over at least a portion of the linear path. A shock absorber is interposed between a shock absorber rack mounting point disposed on the rack and a shock absorber carriage mounting point disposed on the carriage. A plurality of wheels which are mounted to the carriage in wheel locations distributed along a length thereof extending in a direction aligned with the linear guide structure centerline. Each of the wheels has a wheel axis of rotation transverse to the direction of the linear guide structure centerline to facilitate rotation of the wheels on at least a portion of the linear guide structure responsive to the travel. A position configuration of the plurality of wheels facilitates a yaw rotation of the carriage about a carriage axis of rotation. The carriage axis of rotation is transverse to the linear guide structure centerline. The yaw rotation is responsive to a disruptor force when applied at a location laterally offset from the linear guide structure centerline.

The linear guide structure is comprised of first and second rails which extend along the linear path parallel to the linear guide structure centerline. The wheels can each have a channel formed in an outer periphery thereof for receiving a profiled face of one of the first and second rails. The position configuration of the wheels facilitates a selective engagement of the wheels with the linear guide structure. The selective engagement is responsive to the yaw rotation while concurrently facilitating travel of the carriage along the linear guide structure responsive to the disruptor force.

A wheel centerline is defined along the length of the carriage in alignment with the linear guide structure centerline, and the wheel axis of rotation for at least one of the plurality of wheels is laterally offset from the wheel centerline by a predetermined distance. At least two wheels of the plurality of wheels are laterally offset from the wheel centerline in a first direction. Accordingly, the plurality of wheels can be disposed in a staggered configuration between the first and second rails to define the position configuration.

A motor is configured to urge the carriage in a first direction along a length of the linear guide structure. The motor includes an actuator which is configured to selectively decouple from an engagement with the carriage responsive to the disruptor force. The actuator is comprised of an elongated slider which selectively applies a force to a thrust bearing face of a thrust sleeve disposed on the carriage responsive to the operation of the motor. The elongated slider extends through an aperture defined in thrust bearing face. The aperture facilitates travel of the thrust sleeve along a length of the elongated slider responsive to the disruptor force. A spring element is provided to urge the carriage in a second direction opposed from the first direction.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

A disruptor can be mounted to a robotic manipulator arm of an unmanned robotic vehicle (URV). But high impulse loads associated with disruptors have the potential to damage the robot or its manipulator arm. As threats become harder to deal with, explosive ordinance disposal (EOD) personnel deploy higher power disruptor devices which increase the potential for damaging the URV.

Embodiments disclosed herein concern disruptor mounting systems with shock absorbing capability for mounting disruptors on support structures, such as robotic arms, which can be potentially damaged by the shock associated with disruptor firing operations. The shock absorbing mechanism of the disruptor mounting system is capable of absorbing very large shock impulses so as to prevent damage to URVs and their robotic manipulator arms.

According to one aspect, a disruptor mounting system for robotic manipulator arms is disclosed which does not inhibit or otherwise prevent the use of a robotic grasping device, such as may be disposed on a distal end of the arm. Conventional disruptor supports can interfere with the operation of grasping device. Accordingly, a retractable arrangement is disclosed that allows the disruptor support mechanism to be retracted behind the robotic gripper when not needed. When conditions require use of the disruptor, it can be extended beyond the end of the gripper in view of a gripper camera. This feature is facilitated by an extension control motor for the shock absorber mechanism which is advantageously decoupled from a movable carriage during disruptor firing and shock absorbing operations.

The shock absorbing mechanism also facilitates mounting support and shock absorbing capabilities for a plurality of different disruptor devices disposed on a single such shock absorbing mechanism so that multiple disruptor capabilities can be provided. The design of the mounting system and associated shock absorber mechanism has a relatively narrow profile so that it is can be inserted through small openings, such as a car window to facilitate disabling of improvised explosive devices (IEDs).

Advantageously, the shock absorbing mechanism disclosed herein can accommodate disruptors mounted in positions that are offset from the centerline of the robotic arm and shock absorber mechanism, and can accommodate the concurrent firing of multiple disruptor devices. This feature is facilitated by a plurality of carriage wheels which are disposed in staggered positions relative to a centerline of the carriage. The engagement of the wheels with a plurality of rails disposed on a track varies depending on the mounting location of the disruptor that has been fired. These and other features of the embodiments are described below in greater detail.

Figure 1A:
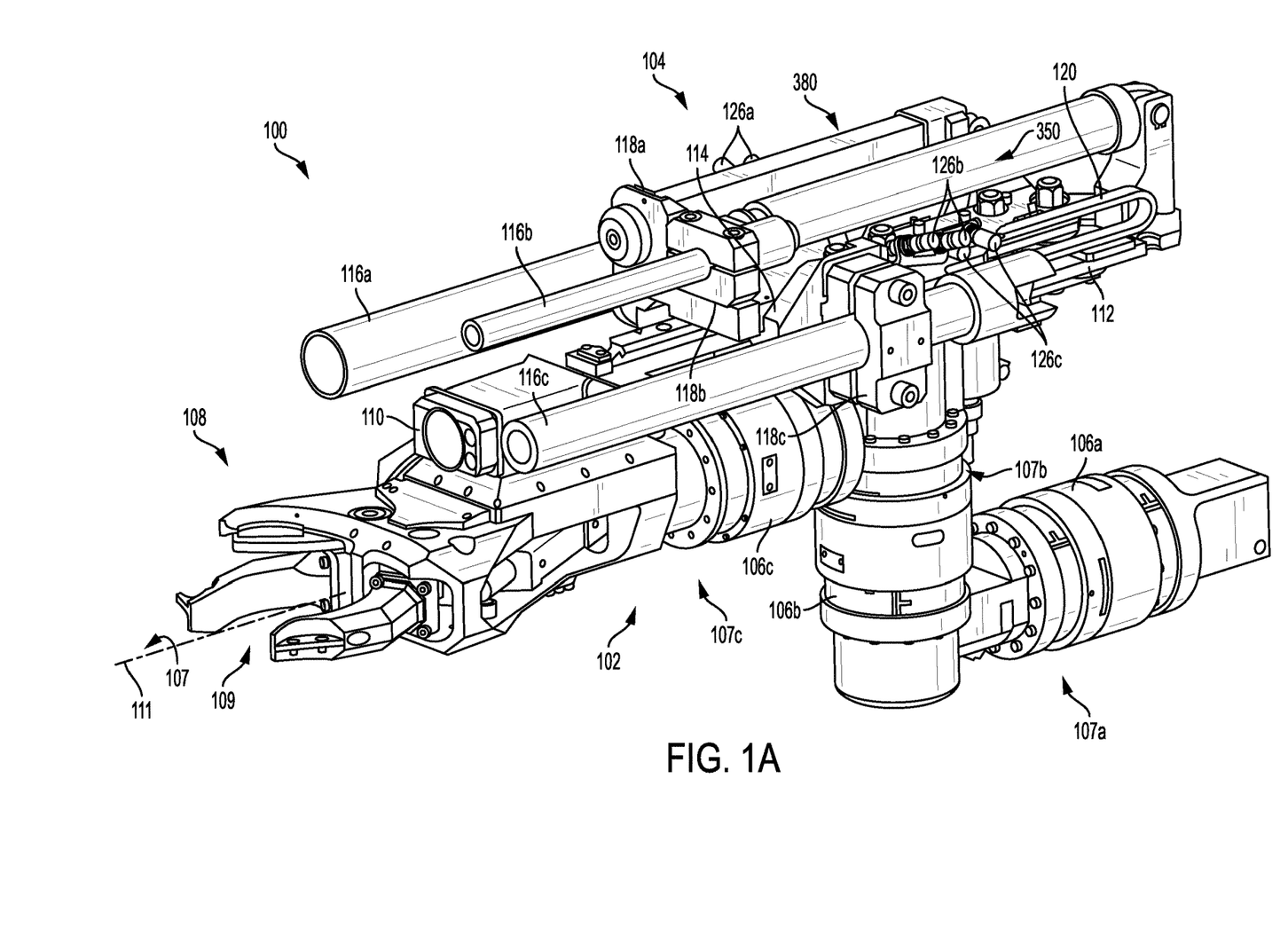
FIGS. 1A and 1B are a series of drawings comprising a robotic arm assembly including a disruptor mounting system shown in a retracted position and extended position.
Figure 1B:
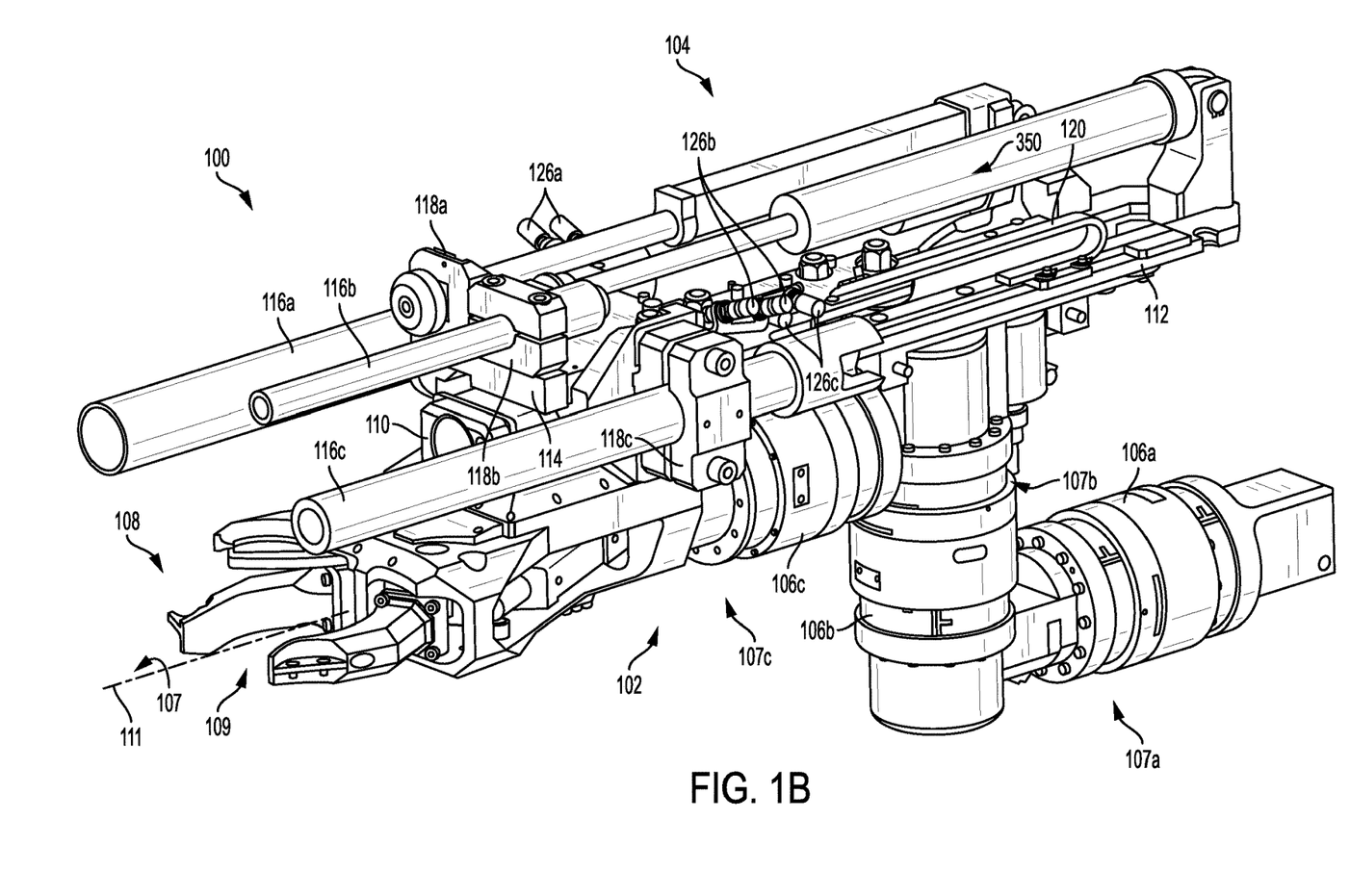

Shown in FIGS. 1A and 1B is a robotic arm assembly 100 which includes a robotic arm 102 and a disruptor mounting system (DMS) 104. The DMS 104 can include a rack 112 and a carriage 114 which is movable on the rack. The carriage 114 includes a plurality of disruptor mounting brackets 118a, 118b, 118c to facilitate mounting of disruptors 116a, 116b, 116c to the carriage 114. The carriage of the DMS is movable along a path between a retracted position shown in FIG. 1A and an extended position shown in FIG. 1B. The robotic arm 102 can be attached to a URV (not shown) or other structure to facilitate positioning of the DMS 104 in close proximity to an explosive device which is to be disarmed. Firing circuit terminals 126a, 126b, 126c can be provided on the carriage 114 to facilitate electrically controlled activation of the disruptors. A flexible conduit 120 can communicate control signals for the disruptors 116a, 116b, 116c between the rack 112 and the carriage 114.

The disruptors 116a, 116b, 116c can comprise any one of several types of commercially available projected water disruptors that use a water projectile to destroy explosive devices. The DMS can be used to absorb shocks (impulse forces) associated with the operation of the disruptor. However, it should be appreciated that embodiments disclosed herein are not limited to impulse forces resulting from the use of disruptors. Other types devices, including firearms and other weapons can similarly produce shocks that must be damped. Accordingly, the word disruptor as used herein can be understood as referring to any device mounted on the DMS which is capable of producing high levels of short duration impulse forces that require damping.

As is known, a robotic arm as described herein can be comprised of several arm sections 106a, 106b, 106c which are connected by movable joints 107a, 107b, 107c. Joint actuators (not shown) disposed within the arm sections can be used to vary a position of the joints and thereby vary a position of the several arm sections. A grasping device 108 can be disposed on a distal end of the arm, attached to one of the several arm sections. A camera 110 can be mounted on a portion of one or more of the arm sections and/or to a portion of the grasping device 108, to facilitate video monitoring of operations carried about by the grasping device. Robotic arms and robotic grasping devices are well known in the art and therefore will not be described here in detail.

Figure 2:
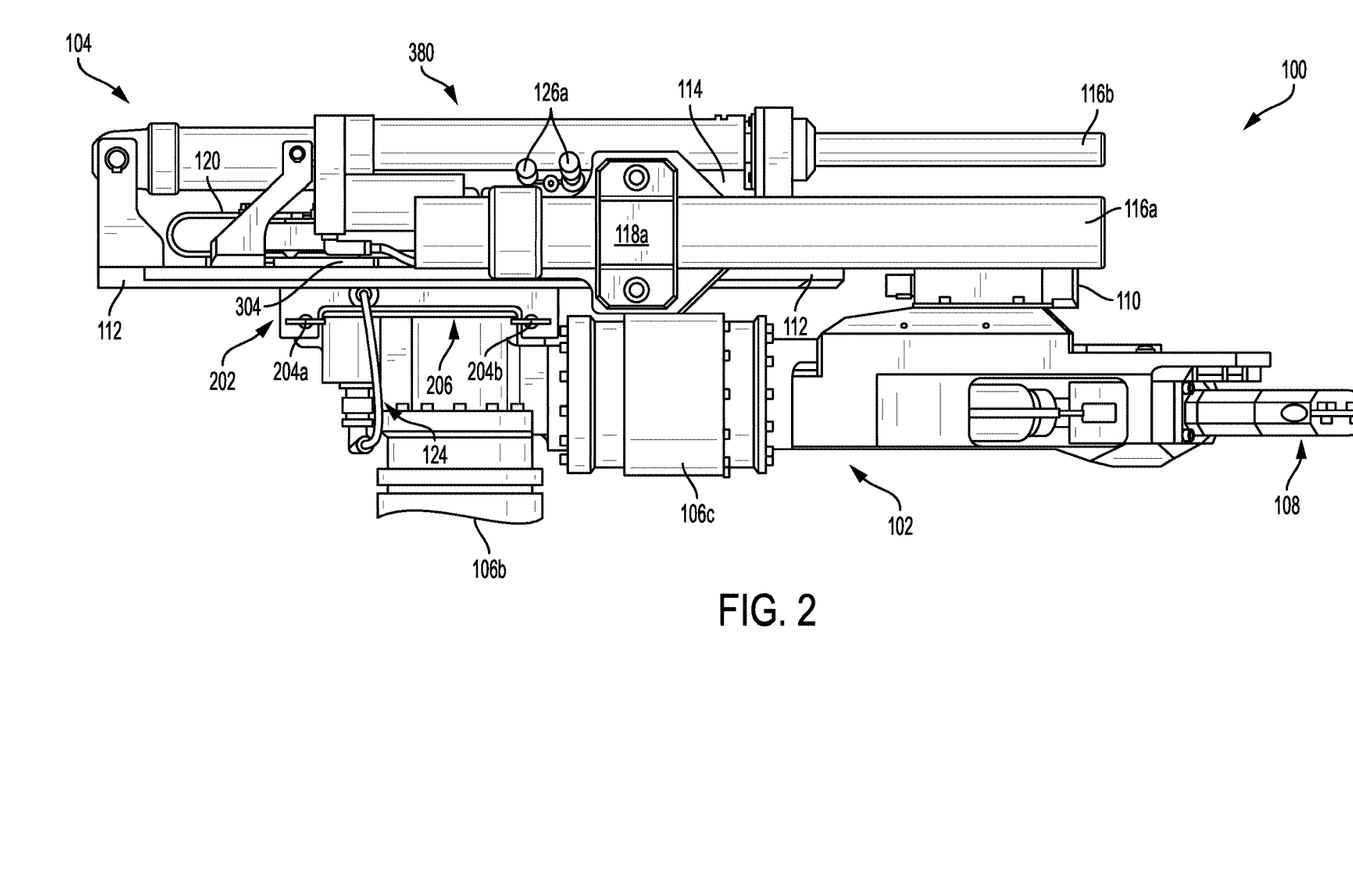
FIG. 2 is a side view of the robotic arm assembly in FIG. 1A.

The DMS 104 can include a base 202 as shown in FIG. 2. The base is advantageously adapted for securement to a mounting support structure, such as robotic arm 102. For example, one or more latches or pins 204a, 204b can be used to removably fix or attach the DMS 104 in a mounting position 206 located on a portion of the robotic arm as shown. A flexible conduit 124 can communicate electrical signals to the DMS for control of the carriage and disruptors.

When the carriage 114 in a retracted position shown in FIGS. 1A and 2, the disruptors 116a, 116b, 116c are advantageously recessed from the grasping device 108 so that they do not impede access to a grasping area 109. Similarly, the disruptors 116a, 116b, 116c are advantageously spaced a suitable distance from an axis of rotation 111 so that they do not interfere with rotation 107 of the grasping device about such axis when the carriage is in the retracted position.

Figure 3A:
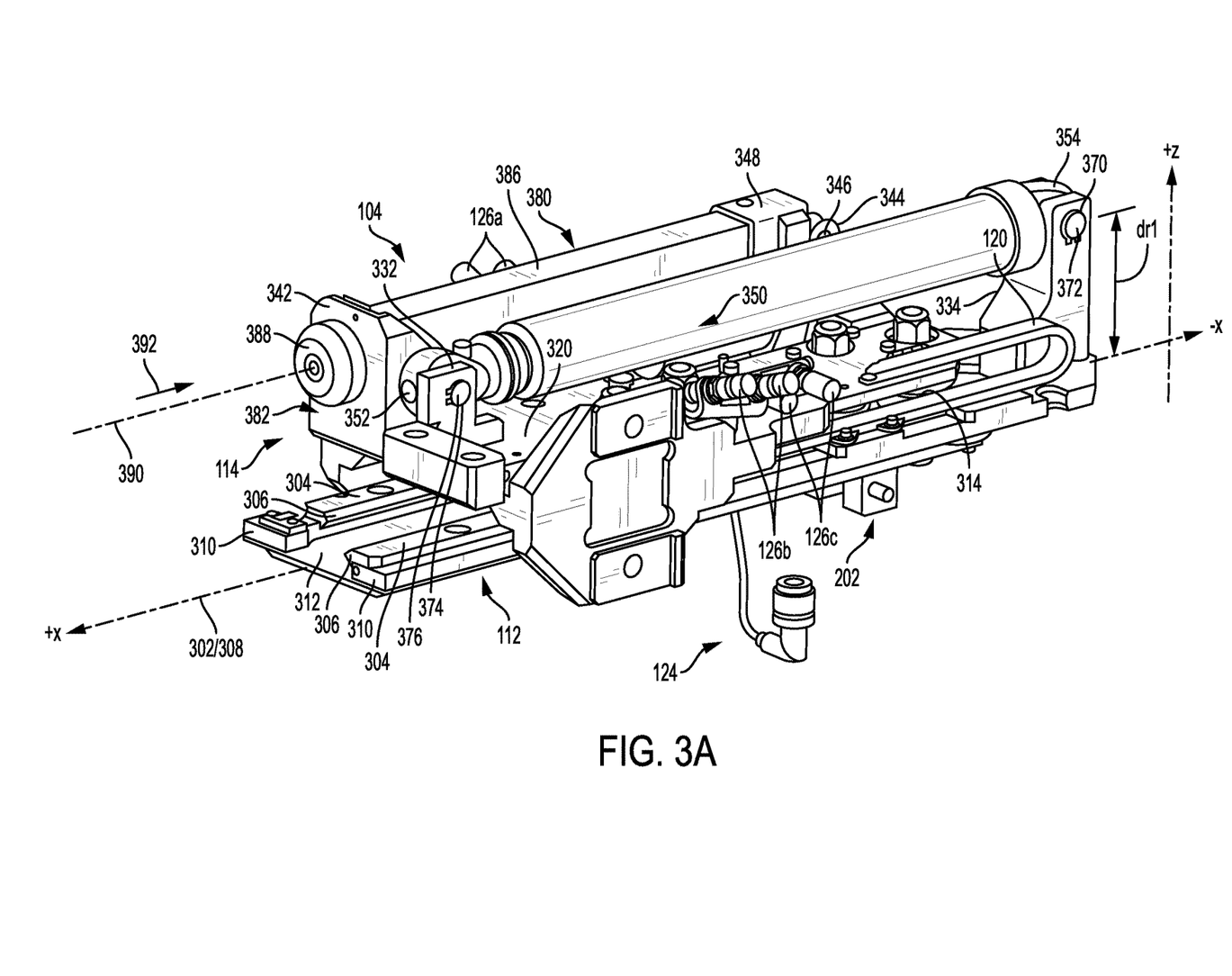
FIGS. 3A, 3B and 3C are perspective views of the disrupter mounting system in FIGS. 1A, 1B and 2, in various states, with disruptors and disruptor mounting brackets omitted for greater clarity.
Figure 3B:
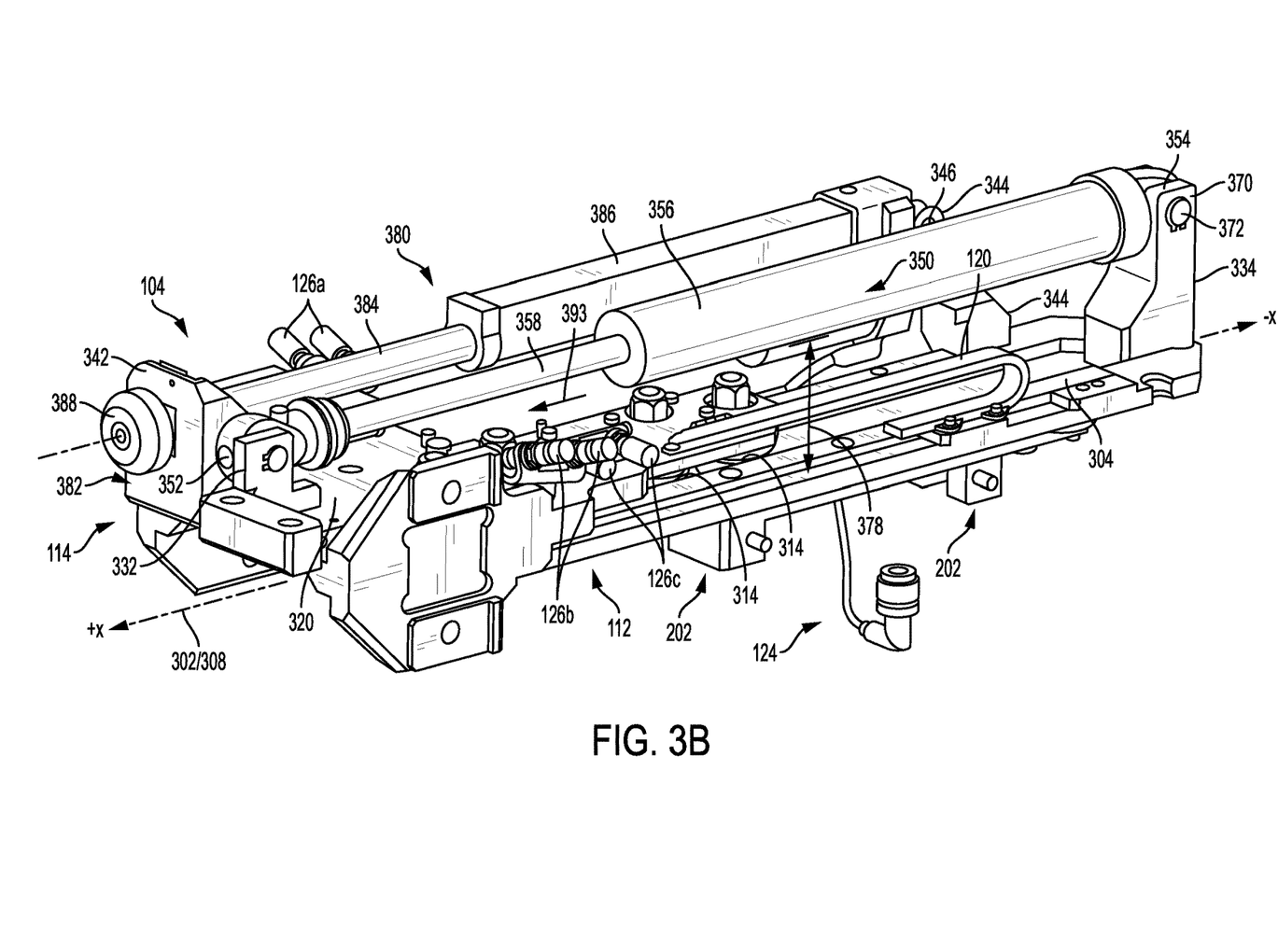
Figure 3C:
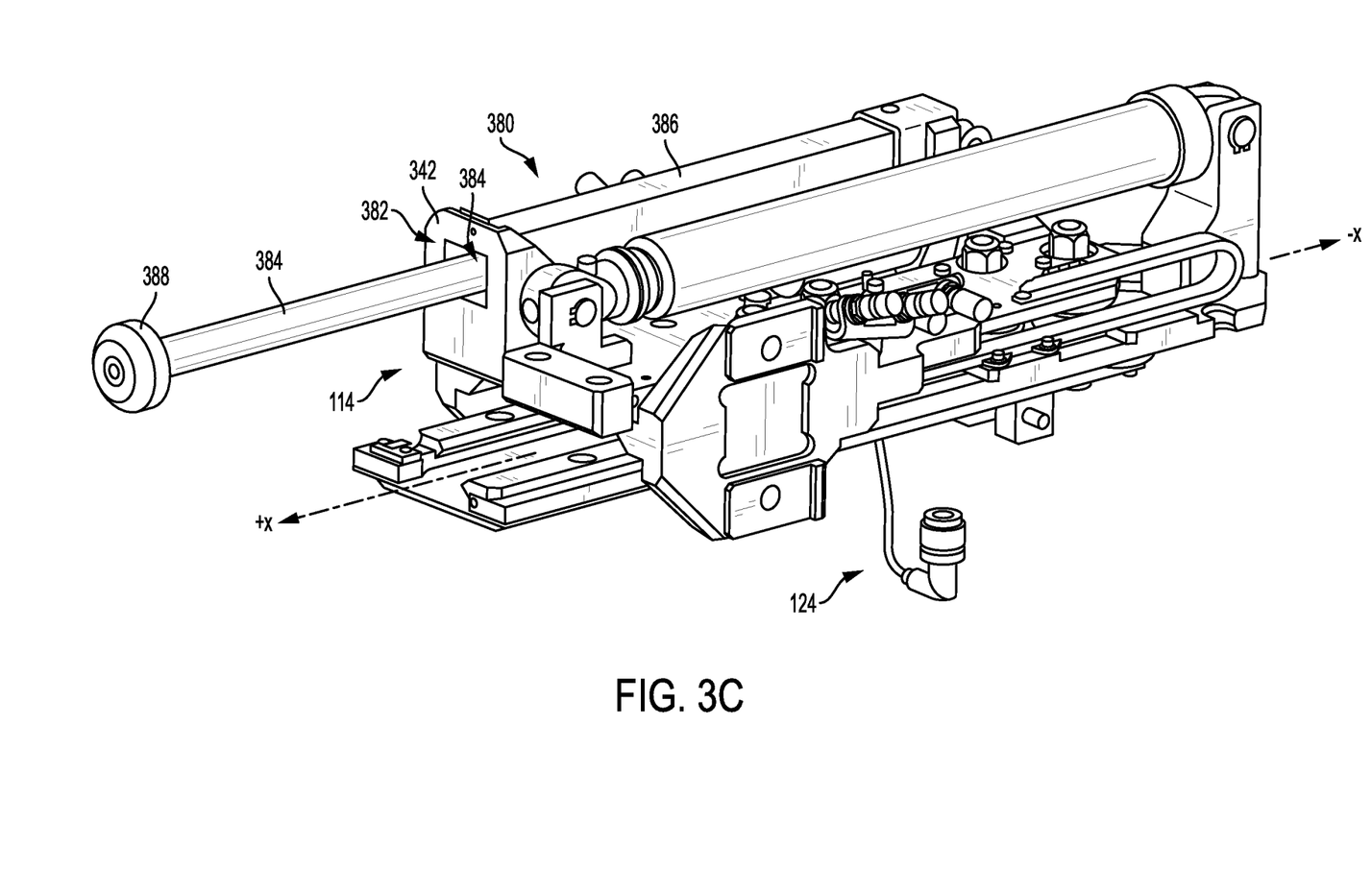
Figure 4:
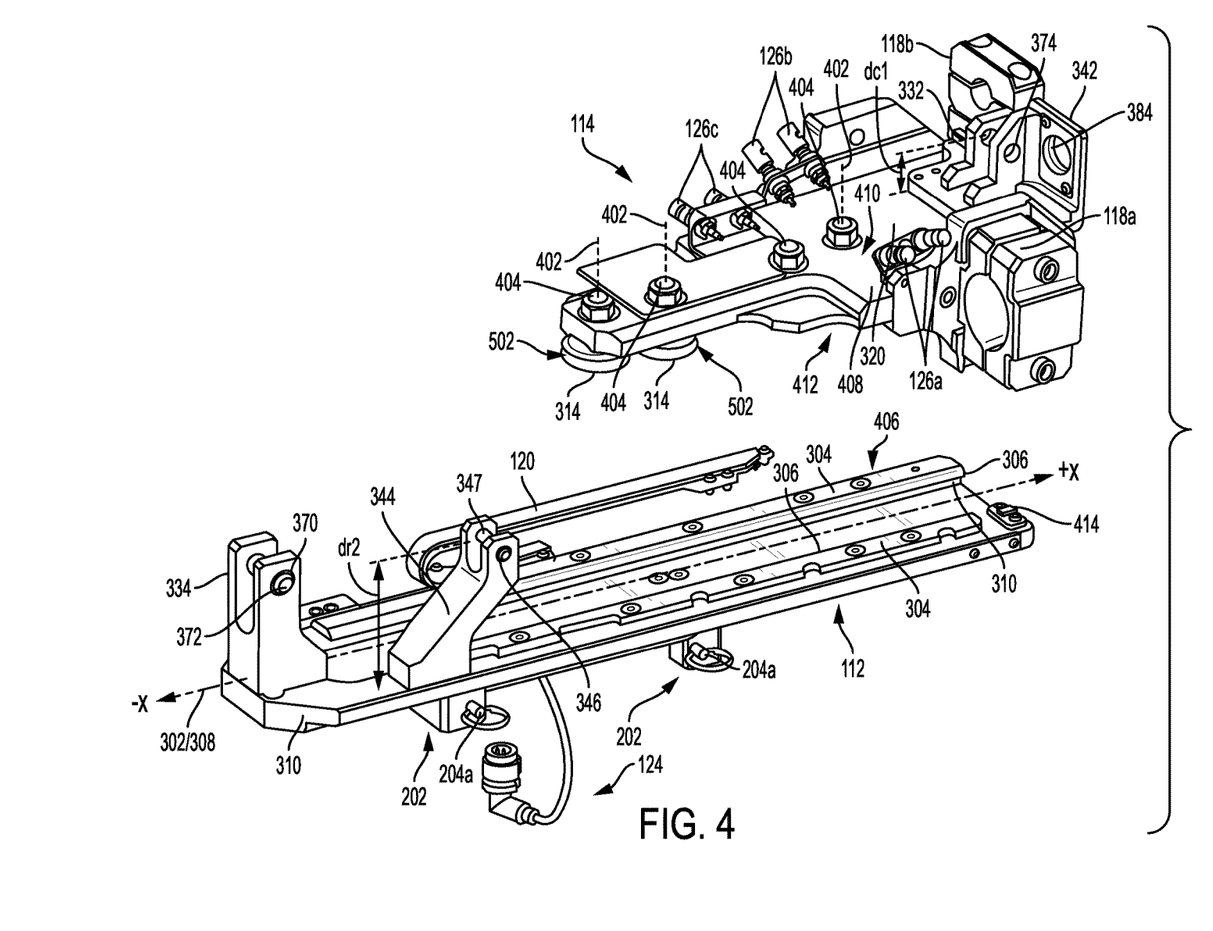
FIG. 4 is an exploded view of the disruptor mounting system showing the carriage and the rack.
Figure 5:
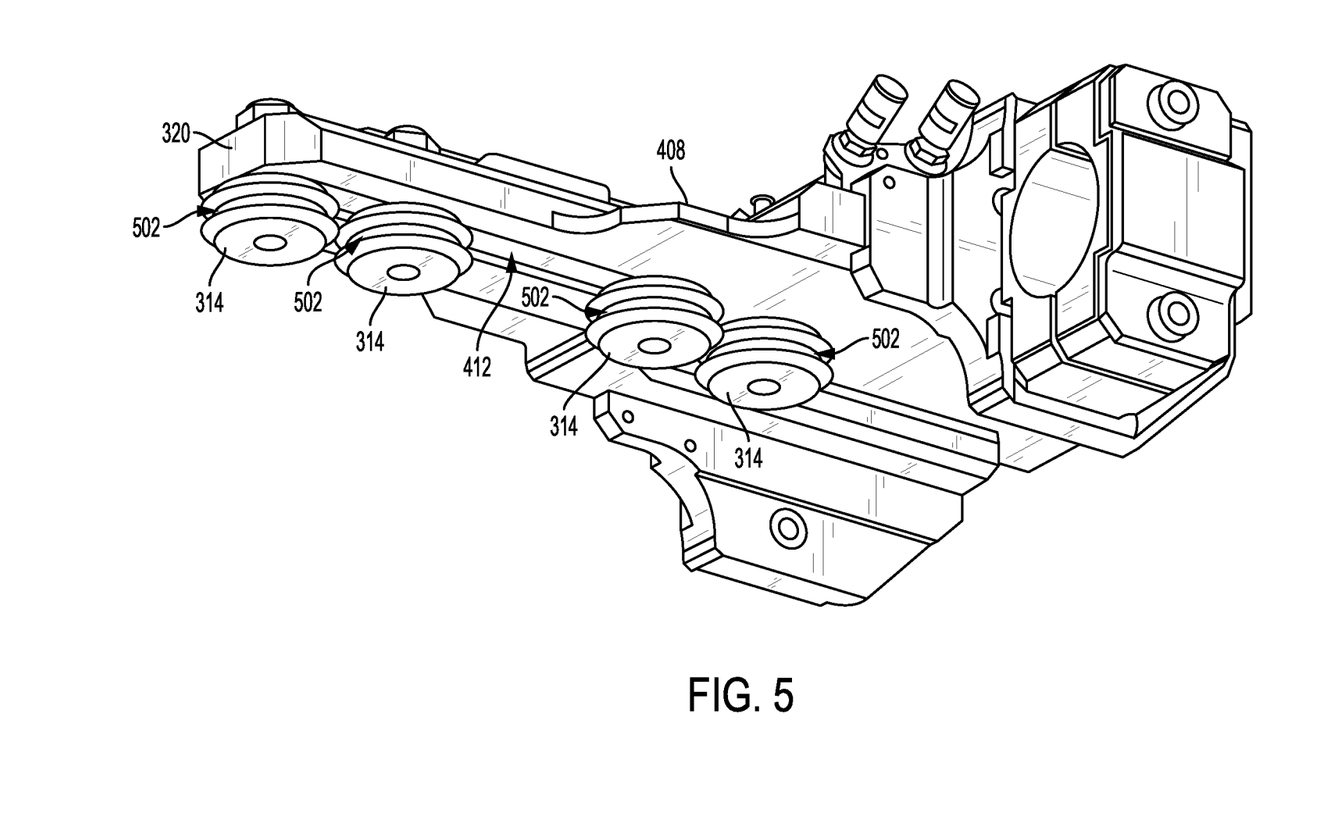
FIG. 5 is a perspective view showing an underside of the carriage in FIG. 4.

Referring now to FIGS. 3-5 it can be observed that the carriage 114 is comprised of a chassis 320 on which a plurality of wheels 314 are mounted. The chassis is formed of a rigid material such as aluminum or steel to withstand repeated application of forces associated with disruptor use without experiencing permanent structural deformation or damage. The chassis can comprise a chassis deck 408 which has opposing upper and lower faces 410, 412. The wheels 314 can be mounted to the chassis deck 408 so that each will have an axis of rotation 402 which is transverse or perpendicular to the motion axis 302. For example, an axle bolt 404 can be provided for each wheel. Each axle bolt 404 can extend transversely through the chassis deck 408, in a direction aligned with the axis of rotation 402. Each axle bolt 404 can therefore define an axle upon which a wheel 314 can rotate. In an exemplary embodiment shown in FIGS. 1-5, the wheels are disposed on the lower face 412 of the chassis deck which is closest to the rack.

The rack 112 is comprised of a linear guide assembly 406 which is configured to guide the wheels 314 along the length of the rack. In an embodiment, the linear guide assembly 406 can include a plurality of elongated rails 304 which extend along the length of the rack, in a direction parallel to the motion axis 302. As such, the chassis 320 can move along the rails in a +x direction (toward the extended position in FIG. 1B), and in the −x direction (toward the retracted position in FIG. 1A).

The wheels and linear guide assembly are advantageously configured so that the wheels 314 are securely retained in engagement with the rails 304. Such retention can be accomplished by any suitable means. In an embodiment disclosed herein, the wheels 314 have formed in them a circumferential v-shaped groove 502 on their outer perimeter and each rail 304 can have a convex v-shaped guide face 306. The v-shaped guide face 306 for each rail protrudes in a direction toward a linear guide structure centerline 308 which is aligned with the motion axis 302. Each rail 304 is advantageously disposed on a rail riser 310 which raises the v-shaped guide face 306 a small distance above the rack floor 312 to form a gap. The gap allows the v-shaped groove 502 formed in each of the plurality of wheels 314 to fully seat in the v-shaped guide face 306 whereby each wheel can be guided along a corresponding rail 304 as the carriage moves in a direction aligned with the motion axis. More particularly, each of the wheels 314 can advantageously roll along one of the rails 304 so as to reduce friction associated with the movement of the carriage.

Disposed at a first end of the rack 112 (e.g., at a location corresponding to an extreme −x direction) is a rack shock absorber mounting structure 334. The rack shock absorber mounting structure extends upwardly away from the floor 312 in a +z direction (transverse to the motion axis) to define a rack shock absorber mounting point 370. The rack shock absorber mounting point 370 is advantageously aligned along the motion axis and linear guide structure centerline 302/308. The rack shock absorber mounting point 370 is spaced a predetermined distance dr1 above the floor 312. Consequently, the chassis can move along the linear guide assembly 406 in a gap 378 which is defined between the floor 312 and a shock absorber 350. The rack shock absorber mounting point 370 is adapted for securing one end portion 354 of the shock absorber 350 to the rack 112 as shown. In an embodiment, the rack shock absorber mounting point 370 can comprise an aperture. In such a scenario, a pin 372 can extend through the mounting point 370 and through a bore (not shown) which is formed through end portion 354 of the shock absorber.

A carriage shock absorber mounting structure 332 is disposed on the chassis 320. The carriage shock absorber mounting structure 332 can extend in the +z direction a predetermined distance dc1 above the upper face 410 of the chassis deck 408. This predetermined distance can be selected so that a carriage shock absorber mounting point 374 disposed on the carriage shock absorber mounting structure is substantially aligned in the +z direction with the rack shock absorber mounting point 370. The carriage shock absorber mounting point 374 is advantageously aligned with the linear guide structure centerline and motion axis 302/308.

In an embodiment, the carriage shock absorber mounting structure 332 can be disposed on a portion of the chassis 320 that is distal from the rack shock absorber mounting structure 334 when the chassis 320 is mounted in the rack 112 as shown in FIGS. 3A and 3B. For example, the carriage shock absorber mounting structure 332 can be disposed on a portion of the chassis which is nearest to the +x direction. Consequently, the shock absorber 350 can extend between the rack shock absorber mounting point 370 and the carriage shock absorber mounting point 332 in a direction aligned with the motion axis 302. The carriage shock absorber mounting point 374 can comprise an aperture for receiving a pin 376. The pin can extend through the mounting point 374 and through a bore (not shown) which is formed through end portion 352 of the shock absorber.

Shock absorbers are well known in the art and therefore will not be describe here in detail. However, it should be appreciated that the shock absorber 350 can be any suitable design that is capable of repeatedly absorbing the shock loads associated with disruptor operations described herein. Accordingly, the shock absorber can comprise any suitable mechanical or hydraulic device which is configured to absorb and damp shock impulses. Exemplary shock absorbers that can be used for this purpose include conventional telescopic mono-tube arrangements and basic twin tube designs. In this regard, the shock absorber 350 can be comprised of a cylinder 356 and a telescoping rod 358.

However, embodiments disclosed herein advantageously utilize a resilient bias force 393 which is applied to the carriage to urge the carriage in the +x direction (toward its fully extended position shown in FIG. 3B). This resilient bias force 393 could be provided by a resilient element such as a coil spring. However, in an embodiment disclosed herein, the resilient bias force and the damping functions can be combined if the shock absorber is a conventional gas type shock absorber. As is known, a gas type mono-tube or twin tube shock absorber exerts a resilient bias force when compressed. This resilient bias force can be used to urge the carriage in the +x direction when the carriage is to be moved from the retracted position to the extended position.

Rack 112 can also include a rack motor mount structure 344. The rack motor mount structure can be laterally offset from the linear guide structure centerline 308 of the rack as shown in FIG. 4. For example, the rack motor mount structure can be positioned on a riser 310. The rack motor mount can extend upwardly away from the riser 310 in a +z direction to define a rack motor mounting point 346. In an embodiment, the rack motor mounting point 346 is spaced a predetermined distance dr2 above the riser as shown. Consequently, the chassis 320 can move along the linear guide assembly 406 in the gap which is defined between the riser 310 and a motor 380. The rack motor mounting point 346 is adapted for securing one end portion 348 of a motor to the rack 112 as shown. In an embodiment, the rack motor mounting point 346 can comprise an aperture. In such a scenario, a pin 347 can extend through the mounting point 346 and through a bore (not shown) which is formed through end portion 348 of the motor.

A thrust sleeve 342 is disposed on the chassis 320. The thrust sleeve 342 can extend a predetermined distance in the +z direction above the chassis deck 408 to define a thrust bearing face 382. The thrust bearing face 382 is advantageously aligned with rack motor mounting point 346, laterally offset from the linear guide structure centerline and motion axis 302/308. In an embodiment, the thrust sleeve 342 can be disposed on a portion of the chassis 320 that is distal from the rack motor mounting point 346 when the chassis 320 is mounted in the rack 112 as shown in FIGS. 3A and 3B. For example, the thrust sleeve 342 can be disposed on a portion of the chassis which is nearest to the +x direction as shown. Consequently, the motor 380 can extend a linear distance between the rack motor mounting point 346 and the thrust sleeve.

The motor 380 is configured to exert a vector force 392 upon thrust bearing face 382. As such, the motor 380 is advantageously a linear motor which is comprised of a slider 384 and a stator 386 aligned along a motor axis 390. The slider 384 is formed of an elongated shaft which has securely fixed on an end distal from the stator 386 a thrust interface

388. The thrust interface interacts with the thrust bearing face 382 to apply force 392 which is aligned with the motor axis 390. The application of force 392 is advantageously used to selectively control movement of the carriage along the rack in the +/−x direction.

When the carriage is to be moved from its extended position in FIG. 3B to its retracted position in FIG. 3A the motor can be operated to apply a sufficient force 392 in the −x direction to overcome the spring bias force 393 which is applied to the carriage in the +x direction. One or more sensors 414 disposed on the rack and/or carriage can be used to determine when the rack has arrived at its retracted position and/or extended position. Once in the retracted position, the motor can continue to apply force 392 to maintain the carriage in its retracted position. Thereafter, when the carriage is to be moved to its extended position the force 392 applied by the motor 380 can be discontinued or reduced so that it is less than the resilient spring bias force 393 applied by the shock absorber 350. The spring bias force will urge the carriage to its extended position shown in FIG. 3B.

When one or more of the disruptors 116a, 116b, 116c are to be used, the motor 380 is operated to allow the carriage to travel to the extended position shown in FIG. 3B. Thereafter, when one or more of the disruptors has been activated they will cause a very large impulse force to be applied to the carriage 114 in the −x direction. This impulse force will be absorbed by the shock absorber 350 as the carriage is concurrently urged in the −x direction by the magnitude of the force. The impulse force will ultimately cause the carriage to momentarily move to a recoil position shown in FIG. 3C. When in the recoil position, the carriage 114 is substantially in the same position as when the carriage is retracted.

During the time when the carriage 114 is responding to the impulse force, the thrust interface 388 will decouple from the thrust bearing face 382. Thereafter, as the carriage 114 moves along the length of the rack 112 in the −x direction, an aperture 384 defined in the thrust sleeve 342 allows the thrust sleeve to travel freely along the length of the slider 384 to a recoil position shown in FIG. 3B. Note that the slider 384 remains in its fully extended position during this transit of the carriage to the recoil position. After the carriage 114 arrives at the recoil position shown in FIG. 3C, the resilient bias force 393 will urge the carriage back to its extended position shown in FIG. 3B. The carriage will thereafter remain in this position until another disruptor is activated or the carriage is caused to move to its retracted position by motor 308.

Figure 6A:
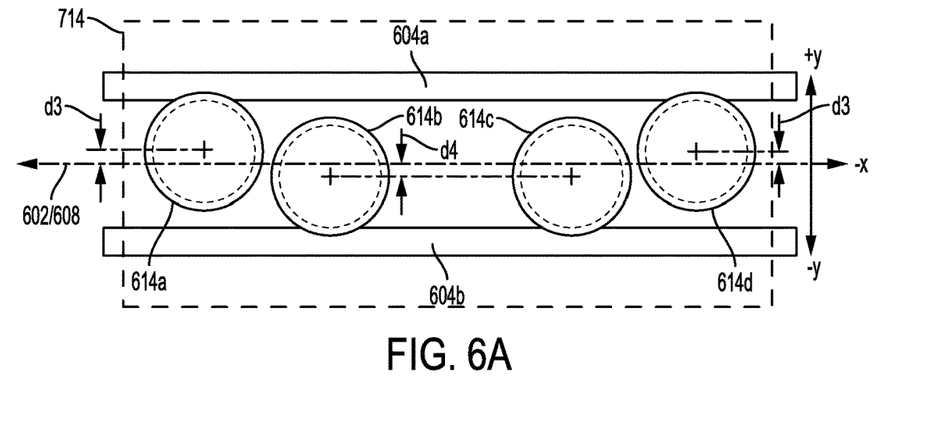
FIGS. 6A, 6B and 6C are a series of drawings that are useful for understanding an arrangement and operation of the wheels located on the underside of the carriage.
Figure 6B:
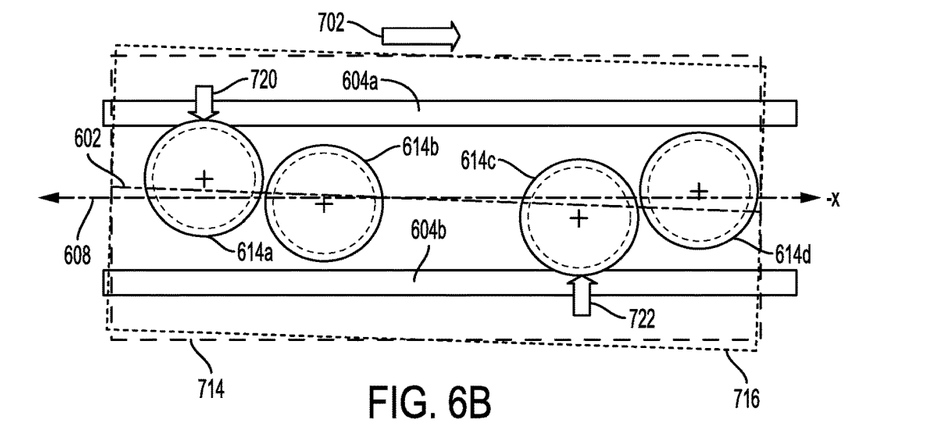
Figure 6C:
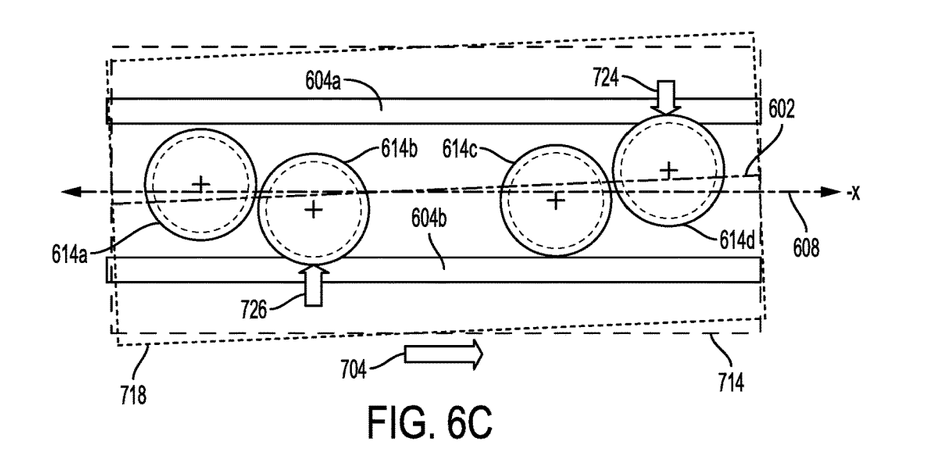

Translational movement of the carriage along the x axis as described herein is facilitated by one or more of the wheels 314. More particularly, the wheels guide the carriage along the path defined by the linear guide assembly 406 as the carriage moves in the +/−x direction. FIGS. 6A-6C comprise a set of schematic drawings which are useful for understanding an embodiment arrangement for a plurality of wheels mounted to an underside of a carriage as described herein with respect to FIGS. 1-5.

FIG. 6A is a schematic representation which shows a top down view of a plurality of wheels 614a, 614b, 614c, 614d mounted to an underside of a carriage which is at rest. The wheels 614a, 614b, 614c, 614d can have a v-shaped groove defined along their outer perimeter to engage a v-shaped guide face in the linear rails 604a, 604b. Accordingly, the arrangement shown in FIG. 6 can be similar to the embodiments described herein with respect to FIGS. 1-5.

It is advantageous for the DMS 104 to have a relatively narrow profile to facilitate its deployment on a robotic arm and insertion into narrow spaces. To facilitate such narrow profile, the linear rails 604a, 604b are closely spaced from each other. But for purposes of absorbing large shock loads and ensuring smooth carriage travel down the path of the linear guide assembly, it is advantageous to utilize wheels having a robust design with a relatively large outside diameter. At the same time, it is important that the wheels which engage one linear rail do not concurrently also engage an opposing linear rail as such interaction would interfere with their rotation. So it is important that a wheel which engages a first linear rail is adequately spaced apart from the opposing linear rail. To accommodate these and other design considerations, the wheels which engage opposing rails 604a, 604b are arranged in a staggered configuration shown in FIG. 6A, rather than being directly opposed in the y direction.

More particularly, it may be observed in FIG. 6A that a wheel centerline 602 can be aligned with a linear guide structure centerline 608 of the linear guide assembly defined by linear rails 604a, 604b associated with a rack (e.g., rack 112). A carriage orientation 714 shows a notional position of the carriage when the system is at rest. It can be observed in FIG. 6A that the wheels 614a, 614b, 614c, 614d are arranged in a staggered configuration whereby adjacent wheels distributed along the wheel centerline are in laterally offset positions with respect to the wheel centerline 602. Each wheel is laterally offset a predetermined distance d3 or d4 in a + or −y direction relative to the wheel centerline 602. In the embodiment shown, a pair of outer wheels 614a, 614d are laterally offset a distance d3 in the +y direction, and a pair of inner wheels 614b, 614c (disposed between the outer wheels) are laterally offset a distance d4 in a −y direction. In an embodiment disclosed herein, d3 and d4 can be the same distance; however, the invention is not limited in this regard. Also, in some scenarios, a greater or lesser number of wheels can be used.

With the arrangement shown in FIG. 6A, each of the wheels will engage at least one rail 604a, 604b when the carriage is urged along the track by a force applied directly along the wheel centerline 602. Wheel 614a and 614d will engage and rotate on rail 604a whereas wheels 614b, 614c will engage with and rotate on rail 604b.

FIG. 6B shows that when a carriage is subjected to an impulse force 702 from the firing of a disruptor located on a first side of the carriage (offset from the wheel centerline 602), a carriage orientation 714 will shift to carriage orientation 716. This shift is due to a rotational moment imparted to the carriage by the disruptor force which causes a momentary deflection of portions of the carriage and/or the rack. As a result, a wheel centerline 602 will transition in accordance with a first rotation direction to a state wherein it is no longer aligned with the linear guide structure centerline 608. Under these conditions, an outer wheel 614a will forced toward rail 604a and an inner wheel 614c will be forced toward rail 604b. In response, reaction forces 720, 722 will be applied on the wheels by the rails 604a, 604b. This configuration will ensure that the linear guide assembly still functions to guide the carriage along the rails in the −x direction.

Conversely, FIG. 6C shows that when a carriage is subjected to an impulse force 704 from the firing of a disruptor located on a second side of the carriage (offset from the centerline 602 in the −y direction), a carriage orientation 714 will shift to carriage orientation 718. As a result, a wheel centerline 602 will transition in accordance with a second rotation direction (e.g. opposite the first rotation direction) to a state wherein it is no longer aligned with the linear guide structure centerline 608. Under these conditions, an outer wheel 614*d* and an inner wheel 614*b* will urged by the disruptor force toward the rails 604*a*, 604*b*. In response, reaction forces 724, 726 will be applied toward the wheels by the rails 604*a*, 604*b*. In each scenario, the linear guide operation remains functional although the orientation of the carriage shifts in response to the impulse forces.

From the foregoing it can be appreciated that a position configuration of the plurality of wheels can facilitate a yaw rotation of the carriage in a first or second direction about a carriage axis of rotation, which is transverse to the linear guide structure centerline. In some embodiments, the carriage axis of rotation is basically parallel to the wheel axis of rotation as shown in FIGS. 6B and 6C. Such yaw rotation can occur responsive to a disruptor force when applied at a location laterally offset from the linear guide structure centerline. It should be appreciated that various different wheel position configurations are possible to facilitate the type of yaw rotation described herein. Embodiments are therefore not limited to that shown in FIGS. 6A and 6B. However, the wheel configuration is advantageously selected so that at least one wheel will roll freely against each of the opposing rails 604*a*, 604*b* comprising linear guide structure as the carriage moves down the length of the guide structure in its yawed condition. The disclosed embodiments facilitate a single shock absorbing mechanism which can be used for multiple disruptor devices which are located in off-axis mounting positions relative to the shock absorbing device.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A shock absorbing disruptor mount, comprising:
   a rack comprised of a linear guide structure which extends in a first direction to define a linear path aligned with a linear guide structure centerline;
   a carriage which is configured to travel on said linear guide structure over at least a portion of the linear path;
   a shock absorber interposed between a shock absorber rack mounting point disposed on the rack and a shock absorber carriage mounting point disposed on the carriage;
   a plurality of wheels which are mounted to the carriage in wheel locations distributed along a length thereof extending in a direction aligned with the linear guide structure centerline;
   each of the wheels having a wheel axis of rotation transverse to the direction of the linear guide structure centerline to facilitate rotation of the wheels on at least a portion of the linear guide structure responsive to said travel; and
   wherein a position configuration of the plurality of wheels facilitates a yaw rotation of the carriage about a carriage axis of rotation transverse to the linear guide structure centerline responsive to a disruptor force when applied at a location laterally offset from the linear guide structure centerline.

2. The shock absorbing disruptor mount of claim 1, wherein the position configuration facilitates a selective engagement of the plurality of wheels with the linear guide structure responsive to the yaw rotation while concurrently facilitating travel of the carriage along the linear guide structure responsive to the disruptor force.

3. The shock absorbing disruptor mount of claim 2, wherein a wheel centerline is defined along the length of the carriage in alignment with the linear guide structure centerline, and the wheel axis of rotation for at least one of said plurality of wheels is laterally offset from the wheel centerline by a predetermined distance.

4. The shock absorbing disruptor mount of claim 3, wherein the linear guide structure is comprised of first and second rails which extend along the linear path parallel to the linear guide structure centerline, and said plurality of wheels each has a channel formed in an outer periphery thereof for receiving a profiled face of one of said first and second rails.

5. The shock absorbing disruptor mount of claim 4, wherein at least two wheels of said plurality of wheels are laterally offset from the wheel centerline in a first direction.

6. The shock absorbing disruptor mount of claim 5, wherein the plurality of wheels are disposed in a staggered configuration between the first and second rails.

7. The shock absorbing disruptor mount of claim 1, further comprising a motor configured to urge the carriage in a first direction along a length of the linear guide structure.

8. The shock absorbing disruptor mount of claim 7, wherein said motor includes an actuator which is configured to selectively decouple from an engagement with the carriage responsive to the disruptor force.

9. The shock absorbing disruptor mount of claim 8, wherein the actuator is comprised of an elongated slider which selectively applies a force to a thrust bearing face of a thrust sleeve disposed on the carriage responsive to the operation of the motor, and wherein the elongated slider extends through an aperture defined in thrust bearing face.

10. The shock absorbing disruptor mount of claim 9, wherein said aperture facilitates travel of the thrust sleeve along a length of the elongated slider responsive to the disruptor force.

11. The shock absorbing disruptor mount of claim 7, further comprising a spring element configured to urge the carriage in a second direction opposed from the first direction.

12. A shock absorbing disruptor mount for a robotic arm, comprising:
- a base configured to mount on a portion of a robotic arm;
- a rack comprised of a linear guide structure and disposed on the base so that the linear guide structure extends along a length of the robotic arm in a first direction toward a robotic grasping device to define a linear path aligned with a linear guide structure centerline;
- a carriage which is configured to travel on said linear guide structure over at least a portion of the linear path and selectively movable between a retracted position where said carriage is a first distance from the grasping device and an extended position where said carriage is a second distance from the grasping device, which is less than the first distance;
- a shock absorber interposed between a shock absorber rack mounting point disposed on the rack and a shock absorber carriage mounting point disposed on the carriage;
- a plurality of wheels which are mounted to the carriage in wheel locations distributed along a length thereof extending in a direction aligned with the linear guide structure centerline;
- wherein each of the wheels has a wheel axis of rotation transverse to the direction of the linear guide structure centerline to facilitate rotation of the wheels on at least a portion of the linear guide structure responsive to said travel.

13. The shock absorbing disruptor mount according to claim 12, wherein a position configuration of the plurality of wheels facilitates a yaw rotation of the carriage about a carriage axis of rotation transverse to the linear guide structure centerline responsive to a disruptor force when applied at a location laterally offset from the linear guide structure centerline.

14. The shock absorbing disruptor mount of claim 13, wherein the position configuration facilitates a selective engagement of the plurality of wheels with the linear guide structure responsive to the yaw rotation while concurrently facilitating travel of the carriage along the linear guide structure responsive to the disruptor force.

15. The shock absorbing disruptor mount of claim 12, wherein a wheel centerline is defined along the length of the carriage, and the wheel axis of rotation for at least one of said plurality of wheels is laterally offset from the wheel centerline by a predetermined distance so that the plurality of wheels are in positions which are staggered along the length of the carriage.

16. The shock absorbing disruptor mount of claim 15, wherein the linear guide structure is comprised of first and second rails which extend along the linear path parallel to the linear guide structure centerline.

17. The shock absorbing disruptor mount of claim 16, wherein at least two wheels of said plurality of wheels are laterally offset from the wheel centerline in a first direction.

18. The shock absorbing disruptor mount of claim 12, further comprising a motor configured to selectively urge the carriage in a first direction along a length of the linear guide structure.

19. The shock absorbing disruptor mount of claim 18, wherein said motor includes an actuator which is configured to selectively decouple from an engagement with the carriage responsive to the disruptor force.

20. The shock absorbing disruptor mount of claim 19, wherein the actuator is comprised of an elongated slider which selectively applies a force to a thrust bearing face of a thrust sleeve disposed on the carriage responsive to the operation of the motor, and wherein the elongated slider extends through an aperture defined in thrust bearing face.

21. The shock absorbing disruptor mount of claim 20, wherein said thrust sleeve includes an aperture which facilitates travel of the thrust sleeve along a length of the elongated slider responsive to the disruptor force.

22. The shock absorbing disruptor mount of claim 18, further comprising a spring element configured to resiliently bias the carriage in a second direction opposed from the first direction.

23. The shock absorbing disruptor mount of claim 11, wherein the spring element and the shock absorber are the same device.

* * * * *